Dec. 30, 1958  L. A. BUSCH  2,866,292
FISH LURE
Filed Sept. 27, 1954
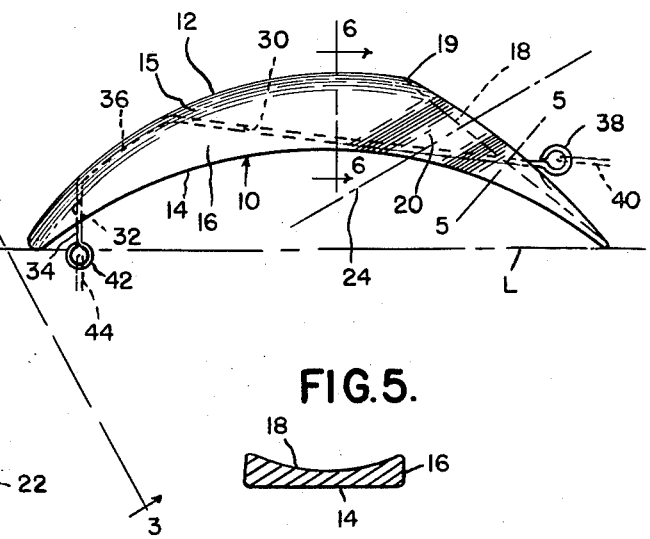
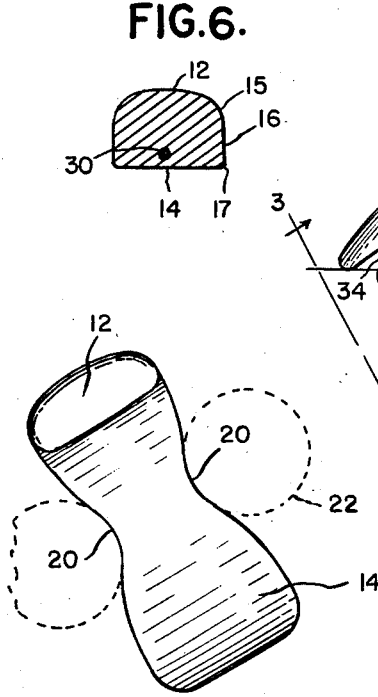
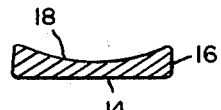
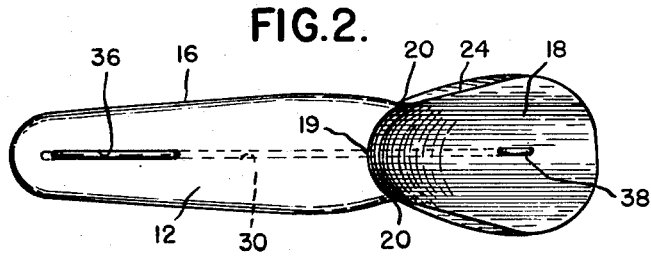
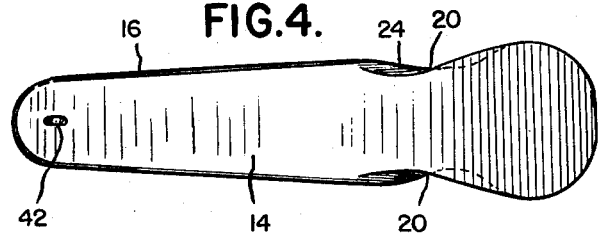
INVENTOR.
LEONARD A. BUSCH

United States Patent Office 2,866,292
Patented Dec. 30, 1958

2,866,292
FISH LURE
Leonard A. Busch, Detroit, Mich.
Application September 27, 1954, Serial No. 458,590
7 Claims. (Cl. 43—42.48)

The present invention relates to a fish lure.

It is an object of the present invention to provide a fish lure characterized by the novel action which it has when towed through the water and which results from the specific shape imparted to the lure.

More specifically, it is an object of the present invention to provide a lure having a characteristic wobble action when towed through the water within the proper range of speed for attracting fish, but which is shaped so that when towed at speeds in excess of the proper range the lure spins so as to provide indication to the fisherman.

It is a feature of the present invention to provide a lure comprising an elongated upwardly bowed body provided adjacent the forward end thereof with cylindrical recesses in the sides thereof extending downwardly and rearwardly from the upper to the lower surface thereof.

It is a further feature of the present invention to provide a lure as described in the preceding paragraph which is formed with a top cylindrical laterally concave recess at the forward end thereof intersecting the side recesses.

It is a further feature of the present invention to provide a lure as described in the preceding paragraph in which the lower surface of the body at the front end thereof is longitudinally concave but composed of transverse straight line elements adapted to define with the top and side recesses a shape at the front of the body similar to a duckbill.

It is a further feature of the present invention to provide a lure having an elongated upwardly bowed body, a wire extending through the body from the top front surface to a point on the top surface adjacent the rear end thereof, thence rearwardly on the top surface of the body, and thence downwardly and through the body to the under surface adjacent the rear end thereof, said wire being provided with eyes at the ends thereof for attachment to a line and hook respectively.

Other objects and features of the invention will become apparent as the description proceeds, especially when taken in conjunction with the accompanying drawings, wherein:

Figure 1 is a side elevation of the lure.

Figure 2 is a top plan view of the lure looking downwardly in Figure 1.

Fig. 3 is an oblique elevational view of the lure looking in the direction of the arrows 3—3 of Figure 1.

Figure 4 is a bottom plan view of the lure looking upwardly in Figure 1.

Figure 5 is a transverse sectional view on the line 5—5, Figure 1.

Figure 6 is a transverse sectional view on the line 6—6, Figure 1.

The improved lure may conveniently be formed of wood, hollow metal, plastic, rubber or any suitable material and is buoyant, and suitably painted, and comprises an elongated body 10 which is upwardly bowed, as illustrated in Figure 1, this figure illustrating a position which the lure assumes in use. The body 10 is rearwardly tapered in thickness as appears from Figure 1, and the upper surface 12 may conveniently be formed on a circular arc. The under surface 14 is also generally circular in cross-section having a somewhat longer radius than the radius of the upper surface and having its center of curvature displaced downwardly and slightly to the left of the center of curvature of the upper surface 12. In addition the lower surface 14 is of arcuate configuration shaped to resemble a segment of a cylinder the longitudinal straight line elements of the cylindrical surface being indicated by shading in Figure 4 and appearing also in sectional views 5 and 6. This produces the generally rearwardly tapering thickness of the body best illustrated in Figure 1. The top surface 12 at the sides is rounded off on substantially large radii 15 as seen in Figure 6, while the bottom surface 14 is rounded off to merge with the sides 16 by relatively small radii as indicated at 17. In addition, the body tapers rearwardly in width as is best apparent from an inspection of Figures 2 and 4. Preferably, the sides 16 of the body may be generally straight except for lateral recesses provided therein, as will subsequently appear.

The entire front end of the body is composed of a concave arcuate surface 18 shaped to resemble a longitudinal segment of a cylinder which extends upwardly and to the rear of the body at an acute angle. The cylindrical surface 18 intersects the lower surface 14 at the extreme front end of the body and intersects the upper surface 12 as indicated at 19. The cylindrical surface 18 is composed of straight line elements indicated by the shading in Figure 2.

In order to produce the particular action characteristic of the present lure, two cylindrical recesses 20 are provided adjacent the front end of the body. The recesses 20 are of cylindrical configuration and are parts of the imaginary cylinders indicated at 22 in Figure 3. The axes of the cylindrical recesses 20 are indicated by the broken line 24 and it will be observed that the cylindrical recesses 20 extend downwardly and rearwardly of the body, intersecting the cylindrical front surface 18 along lines appearing at 24 in Figures 2 and 4. It will also be observed that the axes 24 of the recesses 20 extend in the same general direction as the rearwardly tapered and curved rear portion of the body.

The lure is completed by forming a passage 30 extending from the front surface 18 of the body to the upper surface 12 thereof and a second passage 32 extending directly downwardly from the upper surface to the under surface adjacent the rear thereof. A wire 34 is inserted through the passages 30 and 32 having an intermediate portion 36 which may be received in a shallow groove or recess adjacent the rear top surface of the body. The wire is formed with an eye 38 adjacent its front end for attachment to a line, a portion of which is indicated at 40. The wire is also provided with a second eye 42 adjacent the rear end of the body for attachment to a hook or set of hooks indicated at 44.

The lure is completed by painting the body to any desired color.

Due to its shape, when connected by eye 38 to a line 40, and when provided with one or more hooks connected to eye 42, the lure exhibits stability and will right itself after casting, during trolling or drifting, and while floating with some line tension in a stream or current.

The success of the lure appears to be the result of the movement or action which occurs when it is drawn through the water and the particular action appears to be the result of providing the cylindrical lateral recesses 20.

In use, when moving relative to the water, the lure is drawn under the surface and moves back and forth at speeds dependent on the rate of relative motion through the water. This action is referred to as "swimming" and is similar to natural movements of small fish or other water life on which larger fish feed. When line tension is released, the buoyancy causes the bait or lure to float to the surface. When tension is again applied, the lure rights itself, submerges, and resumes its back and forth or lateral "swimming" movement.

In addition to producing proper action when the lure is being drawn through the water at the proper speed, the lateral recesses contribute an additional function. When the speed at which the lure is being drawn through the water exceeds the range at which good results are to be expected, the lure begins to spin about an axis generally forming an extension of the line connected to the eyes 38. As soon as the lure commences to spin, there is a very perceptible change in tension transmitted to the rod so that the fisherman is instantly aware that the lure has commenced to spin and can take the necessary steps to reduce the speed at which the lure is towed through the water.

It appears probable that the reason the lure commences to spin when a predetermined speed has been reached is that the concave cylindrical recesses 20 are inclined downwardly and rearwardly and tend to assume a position parallel to the direction in which the lure is being drawn through the water. When the lure is drawn at a sufficient speed to cause it to approach a position in which the cylindrical surfaces of the recesses 20 are at a small angle to the direction in which the lure is towed, a condition in which no substantial forces opposing spinning or rotation of the lure remains and the spinning action takes place. In any event, it has been established with a series of lures of the characteristic shape disclosed herein which differ substantially as to size that the spinning action may be attained at approximately the upper limit of the useful range of the lure.

For a specific example of a lure which has operated efficiently, a lure has been produced in which the upper surface 12 was formed on a 1½ inch radius and the lower cylindrical surface 14 formed on a 1¾ inch radius whose center was spaced rearwardly of the center of curvature of the upper surface by about 1/16 inch and spaced downwardly therefrom by approximately 9/16 inch. The front cylindrical surface 18 was formed on a one inch radius extending upwardly and rearwardly at an angle of approximately 39 degrees from a line L tangent to the front and rear ends of the body. The maximum width of the body adjacent the front end thereof was approximately 5/8 inch and its overall length approximately 2 3/16 inches. The cylindrical recesses 20 were formed on radii of approximately ½ inch and were disposed to extend downwardly and rearwardly at an angle of 30 degrees to the line L tangent to the front and rear ends of the body.

The drawings and the foregoing specification constitute a description of the improved fish lure in such full, clear, concise and exact terms as to enable any person skilled in the art to practice the invention, the scope of which is indicated by the appended claims.

What I claim as my invention is:

1. A fishing lure comprising an elongated upwardly convexly bowed buoyant body tapered rearwardly, means adjacent the front end and at the top of the body for securing a line, means at the rear underside of said body for attaching a hook, said body having arcuate parallel concave side recesses formed therein shaped to resemble a longitudinal segment of a cylinder extending from the upper front surface downwardly and rearwardly to the lower surface thereof.

2. A fishing lure comprising an elongated upwardly convexly bowed buoyant body tapered rearwardly, the upper front portion of said body being laterally concave, means adjacent the front end and at the top of the body for securing a line, means at the rear underside of said body for attaching a hook, said body having arcuate parallel concave side recesses formed therein extending from the upper front surface downwardly and rearwardly to the lower surface thereof.

3. A fishing lure comprising an elongated upwardly convexly bowed buoyant body tapered rearwardly, the entire upper front surface of said body consisting of a laterally concave arcuate top recess, means adjacent the front end and at the top of the body for securing a line, means at the rear underside of said body for attaching a hook, said body having arcuate parallel concave side recesses formed therein shaped to resemble a longitudinal segment of a cylinder extending from the upper front surface downwardly and rearwardly to the lower surface thereof and intersecting the laterally concave top recess at the upper front portion of the body.

4. A fishing lure comprising an elongated upwardly convexly bowed buoyant body tapered rearwardly, the entire upper front surface of said body consisting of a laterally concave arcuate top recess, means adjacent the front end and at the top of the body for securing a line, means at the rear underside of said body for attaching a hook, said body having arcuate parallel concave side recesses formed therein shaped to resemble a longitudinal segment of a cylinder extending from the upper front surface downwardly and rearwardly to the lower surface thereof and intersecting the laterally concave top recess at the upper front portion of the body, the lower front surface of said body being longitudinally concave but composed of transverse straight line elements and defining with said top and side recesses a shape similar to a duckbill.

5. A fishing lure comprising an elongated upwardly bowed buoyant body, the under surface of said body being generally cylindrical and composed of transverse straight line elements, the upper surface of said body being longitudinally circularly curved on an arc of smaller radius than the under surface, the centers of said arc and cylindrical curvature being offset to cause the thickness of said body to taper rearwardly, the sides of said body occupying general plane surfaces inclined the cause the width of said body to taper rearwardly, the front end of said body having an arcuate transversely concave surface intersecting the lower surface at the front of said body and extending upwardly and rearwardly to intersect the upper surface of the body at a point spaced substantially from the front end of said body, said body having concave arcuate side recesses formed therein shaped to resemble a longitudinal segment of a cylinder extending upwardly and forwardly from the lower surface rearwardly of the front end and intersecting the concave front surface.

6. A fishing lure comprising an elongated upwardly convexly bowed buoyant body tapered rearwardly in both width and thickness, the top and bottom surfaces of said body being arcuate in longitudinal section said body having at its front end an upwardly and rearwardly inclined laterally concave front surface shaped to resemble a longitudinal segment of a cylinder, said body having concave recesses at its sides adjacent its front end and intersecting said front surface.

7. A lure as defined in claim 6 in which said recesses are of cylindrical shape and have axes inclined downwardly and rearwardly from the front to the lower surface of said body.

References Cited in the file of this patent

UNITED STATES PATENTS

| 1,332,306 | Rush | Mar. 2, 1920 |
| 1,490,161 | Dickman | Apr. 15, 1924 |
| 1,492,228 | Smith | Apr. 29, 1924 |
| 1,663,080 | Heddon | Mar. 20, 1928 |
| 2,187,475 | Lauby | Jan. 16, 1940 |
| 2,314,907 | Sweeney | Mar. 30, 1943 |
| 2,536,553 | La Fleur | Jan. 2, 1951 |
| 2,756,535 | Dean | July 31, 1956 |